United States Patent [19]

Jarl

[11] 4,062,249

[45] Dec. 13, 1977

[54] ARRANGEMENT FOR SENSING THE ROTARY MOVEMENT OF A ROTARY MEANS

[76] Inventor: Carl-Johan Paul Jarl, Allevillan, Svalsta gard, 150 21 Molnbo, Sweden

[21] Appl. No.: 709,406

[22] Filed: July 28, 1976

[51] Int. Cl.² .............................. F16H 1/06; B05C 1/00
[52] U.S. Cl. ...................................... 74/414; 15/230.16
[58] Field of Search ........... 15/230.16, 230.29, 230.30; 74/412 R, 414 U, 421 R, 421 A

[56] References Cited

U.S. PATENT DOCUMENTS

| 2,720,790 | 10/1955 | Sacchini ........................ 15/250.3 X |
| 3,651,699 | 3/1972 | Thomas et al. ................. 15/250.3 X |
| 3,729,766 | 5/1973 | Buchanan ...................... 15/250.3 X |

Primary Examiner—Leonard H. Gerin
Attorney, Agent, or Firm—Fleit & Jacobson

[57] ABSTRACT

An arrangement for sensing the rotary movement of a rotary means is disclosed, said arrangement comprising a sensing member which is arranged to be subjected to a predetermined actuation when the rotary means has rotated a predetermined number of revolutions, and two rotary members which are arranged to rotate at mutually different speeds, directly proportional to the rotary speed of said rotary means, and which are provided with actuating means arranged to cooperate with each other so as to cause said predetermined actuation of the sensing member when the two rotary members reach a predetermined relative position.

10 Claims, 4 Drawing Figures

ARRANGEMENT FOR SENSING THE ROTARY MOVEMENT OF A ROTARY MEANS

The present invention relates to an arrangement for sensing the rotary movement of a rotary means, said arrangement comprising a sensing member which is arranged to be subjected to a predetermined actuation when the rotary means has rotated a predetermined number of revolutions.

One object of the invention is to provide an improved arrangement of the above kind which can be utilized in connection with a limit switch or coupling for an electric motor to cause a disconnection of the motor when the motor has rotated a predetermined number of revolutions. Such a limit switch may be used for instance to control the driving motor of a headlight wiper of the kind described in U.S. Pat. No. 3,887,957. However, it should be noted that the invention is not restricted to any specific field of use. Instead, the arrangement according to the invention may be utilized for a variety of different purposes.

According to the invention there is provided an arrangement of the kind initially specified which is characterized by two rotary members which are arranged to rotate at mutually different speeds, directly proportional to the rotary speed of said rotary means, and which are provided with actuating means arranged to cooperate with each other so as to cause said predetermined actuation of the sensing member when the two rotary members reach a predetermined relative position.

The two rotary members may preferably consist of toothed wheels which mesh directly or indirectly with each other. The actuating means of the rotary members may suitably be arranged for mechanical actuation of the sensing member.

The rotary members may advantageously have mutually parallel rotary axes. Preferably, the rotary members may be mounted in coaxial relation with respect to each other. For instance, the rotary members may be mounted on a common shaft, one of said members being nonrotatably connected to said shaft, while the other member is freely rotatable on said shaft.

In a first embodiment, one of the rotary members is axially displaceable and the actuating means are formed by axially projecting cams provided on adjacent sides of the rotary members. The axially displaceable rotary member may be spring biased towards the other rotary member. The spring force may be caused by a separate spring or it may be obtained by arranging the sensing member so as to rest resiliently against the displaceable rotary member.

In a second embodiment, the actuating means are formed by a body, for instance a spherical ball, which is displaceably received in a through bore in one of the rotary members, and a recess formed in the adjacent lateral surface of the other rotary member.

Below the invention will be further described, reference being had to the accompanying drawing, in which.

Figure 1:
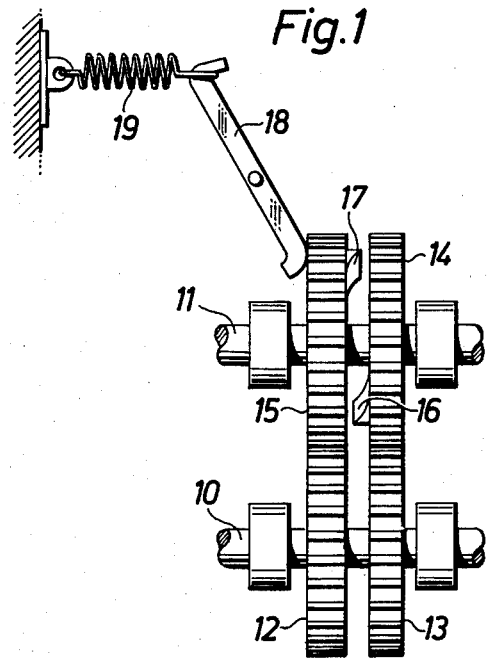
FIG. 1 is an outline showing an arrangement according to a first embodiment of the invention.
Figure 2:
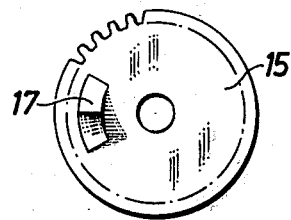
FIG. 2 is an end view of a toothed wheel of said arrangement.
Figure 3:
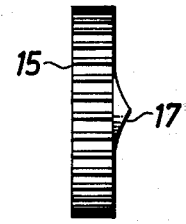
FIG. 3 is a side elevation of the toothed wheel of FIG. 2.

The arrangement shown in FIGS. 1 to 3 comprises two parallel shafts 10 and 11. Each shaft carries two toothed wheels 12, 13 and 14, 15, respectively. The two toothed wheels 12 and 13 may both be rigidly connected to shaft 10. Similarly, toothed wheel 14 may be rigidly connected to shaft 11, while toothed wheel 15 is assumed to be freely rotatable and axially displaceable on shaft 11. From FIG. 1 it can be seen that toothed wheel 12 meshes with toothed wheel 15, while toothed wheel 13 meshes with toothed wheel 14. On their adjacent sides the two toothed wheels 14 and 15 on shaft 11 are provided with axially projecting cams 16 and 17, respectively. The shape of said cams may best be seen from FIGS. 2 and 3.

Reference numeral 18 designates a pivotally mounted lever which forms a sensing member serving to sense the axial position of toothed wheel 15. One end of lever 18 rests against the outer lateral surface of toothed wheel 15, while the other end of lever 18 is connected to a spring 19 which maintains lever 18 in contact with toothed wheel 15 and simultaneously exerts a resilient force on said wheel in a direction towards toothed wheel 14.

Toothed wheels 12, 13 and 14 may all have equal number of teeth. On the other hand, the number of teeth of toothed wheel 15 should be slightly different from that of wheels 12, 13 and 14. As a consequence of this difference, which may be one single tooth, the two toothed wheels 14 and 15 will rotate at speeds slightly differing from each other.

Assuming that the arrangement is started with the two toothed wheels 14 and 15 in a relative position in which the highest points on cams 16 and 17 rest against each other, the same relative position between wheels 14 and 15 will not occur again until said wheels have rotated a large numbers of revolutions. Provided that the number of teeth of the various toothed wheels is appropriately chosen, the tops of cams 16 and 17 will not reach each other again until toothed wheel 15 has been rotated through a number of revolutions corresponding to the number of teeth of said toothed wheel. As a consequence of the gradual circumferential displacement between the two wheels 14 and 15 during the operation of the arrangement and the spring force applied on toothed wheel 15 through lever 16, wheel 15 will leave its outer end position shortly after the initiation of the operation of the arrangement. Toothed wheel 15 will then not reassume said position until the tops of cams 16 and 17 contact each other again. The pivotal movement of lever 18 caused by the axial displacement of wheel 15 may be utilized for instance to operate a breaking switch in the supply circuit of an electric motor which is connected to shaft 10 or 11. The supply of electric current to the motor will then be broken when lever 18 reaches the end position which it is caused to assume when toothed wheel 15 reaches its outer end position.

The arrangement above described may for instance be used in connection with a headlight wiper equipment comprising two wipers of the kind disclosed in U.S. Pat. No. 3,887,957. One wiper may be connected to shaft 10 and the other to shaft 11.

In the embodiment of FIGS. 1 to 3, the two cams 16 and 17 form the necessary actuating means for the sensing member formed by lever 18.

Figure 4:
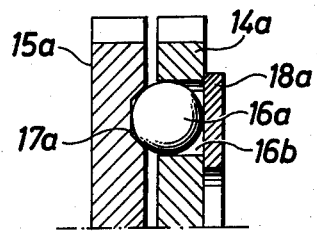
FIG. 4 is a sectional partial side elevation of two cooperating toothed wheels of an arrangement according to a second embodiment of the invention.

Another type of actuating means have been illustrated in FIG. 4. In this case, the actuating means consist of a spherical ball 16a provided in a through bore 16b in toothed wheel 14a, and a recess 17a in the adjacent lateral surface of toothed wheel 15a. The sensing member is formed by a ring 18a which may be carried by an arm (not shown) and spring biased towards toothed wheel 14a. Both wheels 14a and 15a may be mounted in fixed axial positions.

As soon as the arrangement is started from the position shown in FIG. 4, the difference in rotary speed between the two toothed wheels 14a and 15a will cause ball 16a to leave recess 17a, which has a very limited length in the circumferential direction of toothed wheel 15a. Ball 16a will thus be displaced in an axial direction of wheel 14a and move ring 18a to the right from the illustrated position to a new position at some distance from toothed wheel 14a.

The invention is not restricted to the embodiments shown in the drawing. For instance, the mechanical actuating means formed by cams 16 and 17 or by ball 16a and recess 17a may be replaced by actuating means of any other suitable type, even of electric or magnetic type. Additionally, the toothed wheels may be replaced by other suitable rotary members. A simplified embodiment may for instance include only two rotary members corresponding to toothed wheels 12 and 15 and each provided with an appurtenant actuating means.

What I claim is:

1. In an apparatus for sensing the rotary movement of a rotary means, said apparatus comprising a sensing member and actuation means arranged for subjecting the sensing member to a predetermined actuation when the rotary means has rotated a predetermined number of revolutions, the improvement wherein said actuation means comprises two rotary members mounted for rotation at mutually different speeds, directly proportional to the rotary speed of said rotary means and actuatable means operatively associated with said two rotary members and arranged to cause said predetermined actuation of the sensing member when the two rotary members reach a predetermined relative position.

2. In an apparatus as claimed in claim 1, the improvement wherein each said rotary member is comprised of a pair of intermeshing toothed wheels.

3. In an apparatus as claimed in claim 1, the improvement wherein said actuatable means is arranged to cause said predetermined actuation of the sensing member mechanically.

4. In an apparatus as claimed in claim 3, the improvement wherein said actuatable means comprises cooperative cam means on said two rotary members.

5. In an apparatus as claimed in claim 1, the improvement wherein said two rotary members have mutually parallel axes.

6. In an apparatus as claimed in claim 5, the improvement wherein said two rotary members are mounted in coaxial relation with respect to each other.

7. In an apparatus as claimed in claim 6, the improvement wherein said two rotary members are mounted on a common shaft, one of said two rotary members being nonrotatably connected to said shaft while the other of said two rotary members is freely rotatable on said shaft.

8. In an apparatus as claimed in claim 6, the improvement wherein one of said two rotary members is axially displaceable, the actuatable means being formed by axially projecting cams provided on adjacent lateral surfaces of said two rotary members, said actuatable means axially displacing said axially displaceable rotary member when said two rotary members reach said predetermined relative position.

9. In an apparatus as claimed in claim 6, the improvement wherein said actuatable means is formed by a body displaceably received in a lateral surface of one of said two rotary members, said body being receivable in a recess formed in an adjacent lateral surface of the other of said two rotary members when said two rotary members reach said predetermined relative position.

10. In an apparatus as claimed in claim 1, the improvement wherein each said two rotary members is comprised of a pair of intermeshing toothed wheels, and wherein said apparatus further comprises a first shaft rotatable at a speed directly proportional to the rotary speed of said rotary means and a second shaft parallel to and spaced apart from said first shaft, one of each pair of intermeshing toothed wheels being fixedly mounted on said first shaft, the other of each pair of intermeshing toothed wheels being mounted on said second shaft with one of the intermeshing toothed wheels being freely rotatable on said second shaft, one of the intermeshing toothed wheels comprising said two rotary members having a different number of teeth than the other intermeshing toothed wheels so that it rotates at a speed different from the speed of rotation of the other intermeshing toothed wheels.

* * * * *